United States Patent [19]

Fukuda

[11] Patent Number: 4,598,267

[45] Date of Patent: Jul. 1, 1986

[54] METHOD AND APPARATUS FOR CONVERTING A DIGITAL SIGNAL

[75] Inventor: Shinichi Fukuda, Tokyo, Japan

[73] Assignee: Sony Corporation, Tokyo, Japan

[21] Appl. No.: 604,017

[22] Filed: Apr. 26, 1984

[30] Foreign Application Priority Data

Apr. 26, 1983 [JP] Japan .................................. 58-73323

[51] Int. Cl.$^4$ ............................................. H03M 7/20
[52] U.S. Cl. ............................... 340/347 DD; 360/40
[58] Field of Search .................. 340/347 DD; 360/40

[56] References Cited

U.S. PATENT DOCUMENTS 4,348,659 9/1982 Fujimori et al. ............ 340/347 DD

FOREIGN PATENT DOCUMENTS 2101854 4/1982 United Kingdom .

Primary Examiner—L. T. Hix
Assistant Examiner—David M. Gray
Attorney, Agent, or Firm—Lewis H. Eslinger

[57] ABSTRACT

A converted digital signal is provided in NRZI code with a DC component of zero and with a maximum of four bits between level transitions in the signal by dividing the base digital signal into eight-bit base words, each of which is then converted into a ten-bit word signal that has 1024 ($2^{10}$) possible combinations, of which there are 193 that begin with no more than two digital zeros, end with no more than one digital zero, have no more than three consecutive digital zeros anywhere else, and have a DC component of zero when NRZI coded, and each of which is used to represent one eight-bit base word. Each of the remaining 63 of the total 256 ($2^8$) base words is converted into a secondary ten-bit combination having a "convention" DC component of +2 or −2. The number of level transitions in the converted, NRZI-coded digital signal are detected up to the end of the ten-bit combination immediately preceding the next secondary combination and, depending on the number of level changes, the first bit of the next secondary combination is provided to give it a convention DC component, thereby eliminating the DC component in that portion of the signal.

19 Claims, 15 Drawing Figures

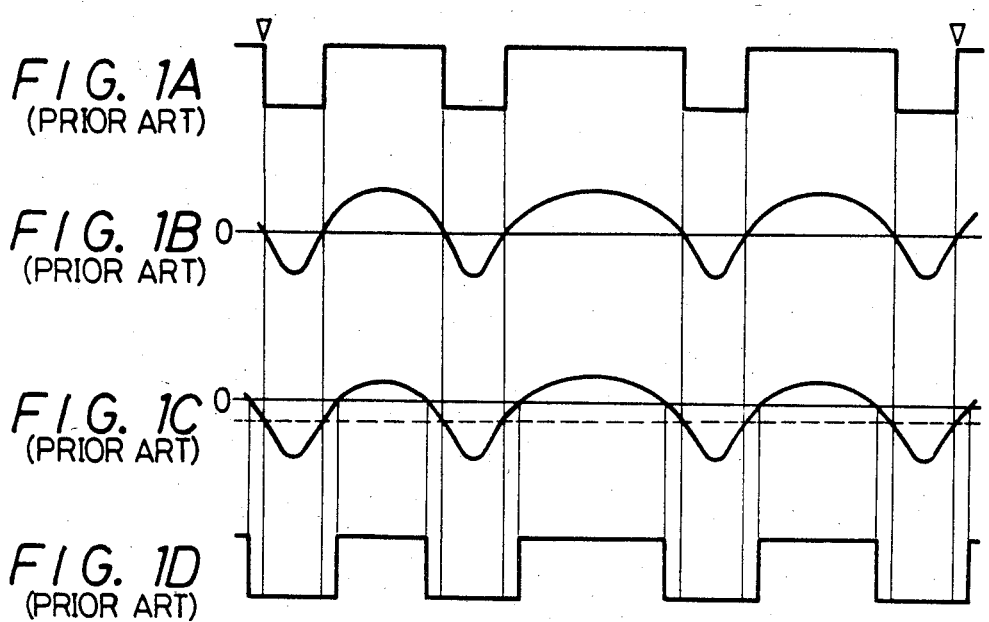
FIG. 1A (PRIOR ART)
FIG. 1B (PRIOR ART)
FIG. 1C (PRIOR ART)
FIG. 1D (PRIOR ART)
FIG. 2A
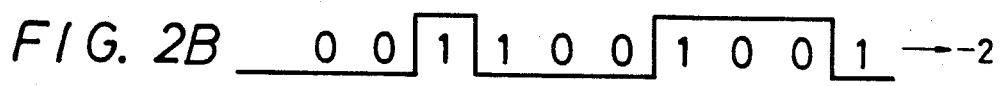
FIG. 2B
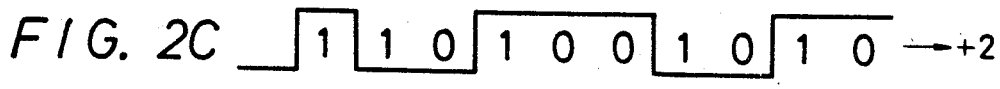
FIG. 2C

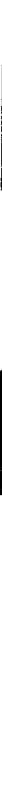

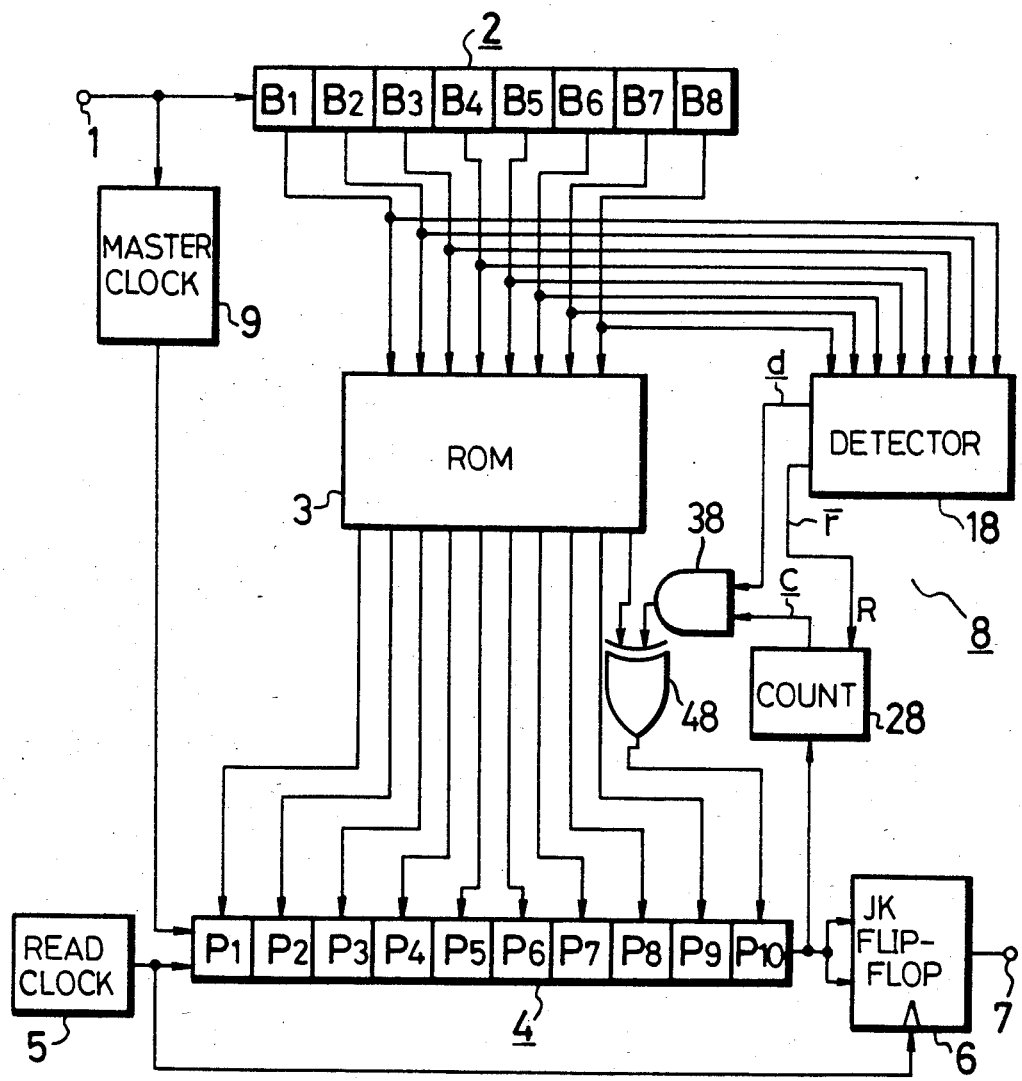

FIG. 5C

| CONTROL SIGNAL Q | COMBINATION TYPE | DC COMP | LEVEL CHANGES | PARITY BIT-P0 (COUNT SIGNAL) | CONTROL SIGNAL Q | LATCH SIGNAL Q |
|---|---|---|---|---|---|---|
| 0 or 1 | PRIMARY | 0 | EVEN | 0 | 0 | 0 |
| | | | | | 1 | 1 |
| | | | ODD | 1 | 0 | 1 |
| | | | | | 1 | 0 |
| 0 | SECONDARY | +2 | EVEN | 0 | 0 | 1 |
| | | | ODD | 1 | 0 | 0 |
| 1 | SECONDARY | −2 | EVEN | 0 | 1 | 0 |
| | | | ODD | 1 | 1 | 1 |

METHOD AND APPARATUS FOR CONVERTING A DIGITAL SIGNAL

BACKGROUND OF THE INVENTION

1. Field of the Invention

The present invention relates to converting digital signals and, more particularly, to a method and apparatus for reducing errors in a digital signal played back from a recording medium.

2. Description of the Prior Art

The fidelity of a recorded signal can be greatly enhanced if the analog signal is converted to digital form prior to recording. A common recording scheme converts the original analog signal into digital data using pulse code modulation (PCM). The PCM digital data is then modulated using the NRZI (non-return to zero, inverted) coding system. The NRZI coding system enables recording at the same bit densities possible with NRZ coding but without the problems associated with signal polarity in NRZ coding.

In the NRZI coding system a "1" digital bit is represented by a transition between the two levels of a bi-level signal, while a continuation of the bi-level signal at the same level represents a "0" digital bit. In NZRI code, then, the actual level of the signal, whether high or low, does not represent digital information. Instead, the digital information is determined by whether or not the signal has changed levels between adjacent bit cells. For example, if the portion of the signal representing a particular bit of digital data is at the same level as the portion representing the preceding bit, then that particular bit is a digital zero.

A problem encountered particularly with magnetic tape recorders is their inherently poor reproduction of low frequency signals. Thus, when NRZI-coding is used, a series of digital zeros (represented by no level transitions in the signal) will be reproduced with reduced fidelity. Converting schemes are commonly used to convert the original or base digital signal into a larger number of digital bits. That way, additional digital ones, or level transitions in NRZI-code, can be artificially provided by selecting bit combinations that have no long periods between level transitions to represent the original digital signal. The present invention uses that approach, which is described in detail below.

Those converting schemes inherently increase the amount of tape required for recording a given amount of the base digital signal. Each base word is represented by a converted word having more bits, and the bit density of any recorded signal has an upper limit defined by the recording head size and the width of the track on the tape available for recording. The bit density can be increased only as long as the resulting decrease in the signal-to-noise (S/N) ratio of the reproduced signal enables reliable recovery of the recorded signal on playback. That problem is aggravated in portable tape recorders because recording head size is reduced to provide portability.

The S/N ratio can be increased by optimizing certain properties of the recorded signal, in particular the ratio between the "window margin", $T_w$, and the "minimum length between transition", $T_{min}$. $T_w$ represents the time required to read the information in any given part of the signal and $T_{min}$ is the time occupied by one bit of data in the signal. If $T_w/T_{min}$ is made as small as possible, preferably lower than 2, then the S/N ratio can be maintained at a level that will enhance accurate reproduction. It is also desirable to minimize the ratio of $T_{max}/T_{min}$, where $T_{max}$ is the maximum time between level transitions. In an NRZI-coded signal, $T_{max}$ is determined by the number of consecutive zeros. As $T_{max}/T_{min}$ becomes larger, the frequency of the recorded signal decreases, which affects the fidelity of the reproduced signal.

As for converting schemes, one prior art method for using a particular number of bits of digital data to provide a larger number is the Gabor code. It converts a combination of two bits of data ($B_1$, $B_2$) of a base signal into a three-bit combination ($P_1$, $P_2$, $P_3$), according to the following formula:

$$P_1 = \overline{P_{3p}} + B_1 + \overline{B_2} \times B_{1f}$$

$$P_2 = P_{3p} \times \overline{B_1} + B_2$$

$$P_3 = \overline{P_{3p}} + B_1 + B_2$$

where p represents the information from the group of data just converted, f represents the information from the next group to be converted, and the bar indicates an inversion (from "0" to "1", or vice versa) of the particular bit with the bar.

The converted signal is restored according to these formulas:

$$B_1 = \overline{P_{3p}} \times P_{1p} + P_{3p} \times P_1 \times P_3$$

$$B_2 = P_2 \times P_3$$

By using the Gabor code for the conversion, $T_2 = 0.67T$ and $T_{min} = 0.67T$, (where T = the duration of the signal representing one bit) so that $T_w/T_{min} = 1$. $T_{max}$, when the converted signal is NRZI-coded, in the Gabor Code can be limited to 1.33T. The ratio of $T_{max}/T_{min}$ is thus 2, which is small enough to enable accurate reproduction of the recorded signal.

Another converting system converts four bits into five bits. Five bits can be combined in 17 different ways in which no more than two digital zeros will ever appear together (either internally or from one 5-bit word to the next). Those 17 ways are the digital representations of the decimal numbers 9–11, 13–15, 18, 19, 21–23, 25–27 and 29–31. Since the original four bits can assume only 16 combinations, it is possible to use a 4/5 converting system to record in NRZI code such that no more than two digital zeros ever appear consecutively. Hence, in the 4/5 converting system, $T_w = 0.8T$, $T_{min} = 0.8T$ and $T_{max} = 2.4T$ when NRZI-coded. The ratio $T_w/T_{min}$ is 1 and $T_{max}/T_{min} = 3$, both of which provide adequate fidelity of the reproduced signal.

Another problem encountered in digital signals recording results from the fact that a DC signal cannot be recorded or reproduced accurately. With NRZI-coding, detection of the location of the changes between the high and low levels of the signal is critical to accurate recovery of the digital data. But since the DC level of the signal is lost in recording, level changes in the reproduced signal cannot in many cases be accurately determined. Neither of the converting schemes described above, the ⅔ Gabor code scheme and the 4/5 scheme, lends itself to accurate recovery of the information because of problems in determining the proper DC level to use in detecting signal level changes.

U.S. Pat. No. 4,387,364, which is assigned to the assignee of the present invention, describes a technique for overcoming that problem which is useful with NRZ coding. While that technique is effective for NRZ coding, it does not disclose a solution to the same problem when NRZI coding is used. In addition, the disclosed technique results in a signal with a $T_{max}/T_{min}$ ratio that is high enough to increase the possiblity that distortion will occur when the signal is played back.

Converting systems are known which convert 24 bits into 30 bits or 16 bits into 20 bits and which enable accurate recovery of level transitions in the signal. Both of those systems have practical problems. The number of bits required to effect the conversion is excessive, as is the number required to restore the original signal. The converted signal has enough additional bits that the length of recording medium is greatly increased. The apparatus required to carry out those converting systems thus becomes unduly large and complex.

SUMMARY OF THE INVENTION

It is an object of the present invention to overcome the shortcomings of the prior art.

It is another object of the present invention to provide an NRZI-coded signal having a DC component substantially equal to zero with a minimum of low frequency components.

It is a further object of the present invention to provide a method and apparatus for converting a base digital signal into an NRZI-coded converted digital signal with a DC component substantially equal to zero and a predetermined maximum time between level changes.

In accordance with an aspect of the present invention, digital signal with at least two levels is provided with a DC component substantially equal to zero and a predetermined maximum time between level changes by dividing a base digital signal into a series of base words each with n bits of data. The base digital signal converted into a converted digital signal by matching a converted word with each base word, each converted word having m bits of data, wherein m is greater than n and the converted digital signal has a predetermined maximum number of consecutive digital zeros. The converted words include a plurality of primary combinations of bits having a DC component substantially equal to zero when NRZI-coded and a plurality of secondary combinations of bits having a DC component with an absolute value of two when NRZI-coded. The secondary combinations in the converted digital signal are provided with DC components so that a portion of the converted digital signal including a pair of secondary combinations has a DC component substantially equal to zero when NRZI-coded. The converted digital signal is generated as an NRZI-coded digital signal.

The above and other objects, features and advantages of the present invention will be apparent when considering the detailed description of preferred embodiments of the invention which follows.

BRIEF DESCRIPTION OF THE DRAWINGS

FIGS. 1A–1D illustrate one source of distortion in a prior art digital signal caused by the inability of recording systems accurately to record and reproduce DC levels.

FIGS. 2A–2C illustrate possible ten-bit secondary combinations of a converted digital signal NRZI-coded in accordance with the present invention.

FIG. 3A illustrates a ten-bit secondary combination of a converted digital signal NRZI-coded in accordance with the present invention.

FIG. 3B illustrates the ten-bit combination shown in FIG. 3A with the first bit thereof inverted from a digital zero to a digital one in accordance with the present invention.

FIGS. 4A and 4B illustrate converted digital signals provided in accordance with the method of the present invention.

FIG. 5A schematically illustrates apparatus for generating an m-bit NRZI-coded converted digital signal from an n-bit base digital signal in accordance with one embodiment of the present invention.

FIG. 5C depicts the programming of the programmable memory means used in the embodiment shown in FIG. 5B.

DETAILED DESCRIPTION OF PREFERRED EMBODIMENTS

Figure 5B:
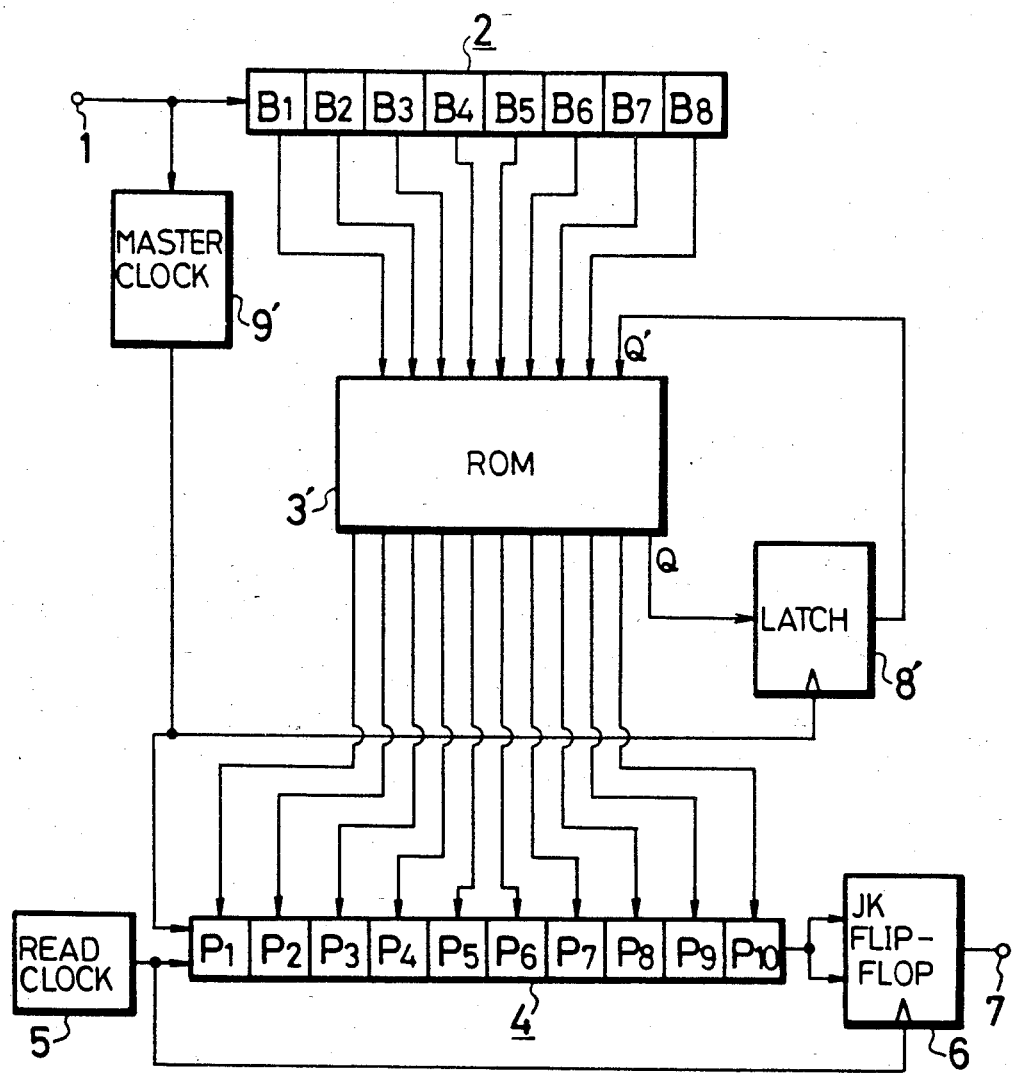
FIG. 5B shcematically illustrates an alternate embodiment of the apparatus shown in FIG. 5A.

The advantages of the present invention can be better appreciated by gaining an understanding of one of the problems encountered in prior art recording systems.

FIG. 1A shows a digital signal to be recorded on a magnetic medium. FIG. 1B shows the waveform of the signal in FIG. 1A after it is played back from the medium. The reference or zero level for detecting the digital information in the signal in FIG. 1B is determined by finding the DC level that yields zero when the signal is integrated about that level. As FIG. 1C shows, that level (the solid line) can be offset from the level (the dashed line) that corresponds to the correct reference level shown as the "zero" line in FIG. 1B. Thus, the restored digital signal recreated from FIG. 1C, as shown in FIG. 1D, is distorted. It will also be clear from FIGS. 1A–1D that if a given sample of the signal in FIG. 1A contains an equal number of high- and low-level portions, then the reference level can be determined accurately.

In the signal sample between the inverted delta markers shown in FIG. 1A, the "DC component" would, according to convention and for purposes of the present invention, be expressed as +3, which value is obtained by giving the signal's low- and high-level portions DC values of −1 and +1, respectively. Mathematically, the DC component of any digital signal portion like that shown in FIG. 1A is obtained by integrating the signal about an axis midway between the high and low levels of the signal and then normalizing the result by dividing it by the absolute value of the DC component of one bit.

In any case, the greater the absolute value of a signal's DC component, the more difficult its reproduction becomes. The technique disclosed in U.S. Pat. No. 4,387,364, referred to above, for enhancing the fidelity of a reproduced digital signal involves reducing the DC component of an NRZ-coded signal. A technique for reducing the DC component in an NRZI-coded signal using an 8/9 converting scheme is disclosed in U.S. patent application Ser. No. 371,284, filed Apr. 23, 1983, and assigned to the assignee of the present invention. The technique employed by that application, however, can yield a DC component of between +4 and −9. In addition, in that technique the maximum length between transition can be as long as 14 bit cells ($T_{max}/T_{min}=14$), which can result in extended periods without a level change and relatively low frequency portions in the signal.

Therefore, to optimize the conditions for recording a digital signal, it is preferred that NRZI coding be used to provide a signal in which the DC component is zero, the ratio $T_{max}/T_{min}$ is no greater than four and $T_w/T_{min}$ is a minimum.

The preferred embodiment of the present invention employs a 8/10 converting scheme in which each eight bits of digital information in a base digital signal is converted to a ten-bit word to form a converted digital signal. Eight bits ($B_1$, $B_2$, $B_3$, $B_4$, $B_5$, $B_6$, $B_7$, $B_8$) can be combined in 256 ($2^8$) different ways. With 10 bits, 1024 ($2^{10}$) combinations are possible. Thus, 256 of the 1024 possible ten-bit combinations are used to represent the eight-bit combinations.

In accordance with the conditions set forth above, there are certain constraints on which 256 combinations can be used. First, those conditions require that the DC component in the converted signal be zero. Second, because NRZI coding is being used, the number of consecutive digital zeroes in the converted signal must never exceed three, otherwise $T_{max}/T_{min}$ will be greater than four.

With those constraints, the following table shows the possible combinations of ten digital bits in NRZI code for which the DC component is zero, but in which there are no more than three digital zeroes in a row (either internally of each ten-bit word or at the juncture between two such words):

TABLE I

|  | 1... | 10... | 100... | 1000... |
|---|---|---|---|---|
| 1... | 69 | 34 | 14 | 4 |
| 01... | 40 | 20 | 8 | 1 |
| 001... | 20 | 10 | 3 | 1 |
| 0001... | 8 | 3 | 2 | 1 |

Table I shows that there are numerous possible combinations that will satisfy the constraints. For example, if up to three digital zeroes are permitted at the begining of each word, then no digital zeroes can be permitted at the end of any word. In that case, Table I shows that the total of the possible combinations is:

$$137 = 69 + 40 + 20 + 8$$

From all of the possible combinations in Table I, the maximum total is achieved if no more than two digital zeroes are permitted at the beginning of a ten-bit converted word and no more than one digital zero is permitted at the end. In that case, the total is:

$$193 = 69 + 40 + 20 + 34 + 20 + 10$$

Thus, 193 ten-bit combinations are available for which the DC component is zero. These are called "primary combinations."

Since there are 256 possible eight-bit words of original data, 63 additional ten-bit combination are required to represent all of the original data. Thus, it is necessary to use ten-bit combinations for which the DC component is not zero.

The following table illustrates the number of possible combinations of ten-bit combinations, which begin with no more than two digital zeroes and end with no more than one digital zero, having DC Component with 0, −2 and +2 when NRZI-coded.

TABLE II

|  | −2 | 0 | +2 |
|---|---|---|---|
| 1... | 52 | 103 | 100 |
| 01... | 43 | 60 | 40 |
| 001... | 30 | 30 | 11 |

Table II shows the 193 (=103+60+30) possible combinations in which the DC component is zero, as discussed in connection with Table II. Note that the entries in the "0" column of Table II: 103 (=69+34); 60 (=40+20), and 30 (=20+10), represent the totals from the "... 1" and "... 01" columns of Table I.

To calculate the DC components for Table II it was assumed that the last bit of the next-preceding ten-bit combination was at the signal's low level. If Table II were constructed by assuming that the level of the last bit of the preceding word was high, then the "−2" and "+2" columns would be interchanged. In any case, the assumption regarding the beginning level of the converted words is merely a convention. The DC component obtained under that convention will be referred to as the "convention DC component". As will be clear below, it does not affect the present invention that the convention is so established. That particular convention is adopted only for purposes of this description.

FIGS. 2A-2C illustrate some examples of the converted words used to construct Table II. For example, FIGS. 2A and 2B show ten-bit combinations in NRZI code with a convention DC component of −2; FIG. 2C shows a ten-bit combination with a convention DC component of +2. FIGS. 2A-2C also illustrate that if Table II were constructed defining the convention DC component by assuming the last bit of the next-preceding ten-bit combination was at the signal's higher level, the "2" and "+2" columns would be reversed.

In any case, since only 193 primary ten-bit combinations, with a zero DC component, are available, 63 more "secondary combinations", those with a non-zero DC component are required to completely represent all of the 256 combinations possible with the original eight-bit data words. For reasons that are explained below, it is necessary in this embodiment of the invention that the initial bit of the ten-bit combination in NRZI code be a digital zero. In addition, in this embodiment of the invention the convention DC component of all of the secondary combinations is the same. That being the case, Table II shows that there are insufficient combinations (40+11) of bits having a convention DC component of +2. Thus, the required 63 additional combinations are chosen from the 73 (43+30) ten-bit combinations having a convention DC component of −2.

FIGS. 3A and 3B illustrate an important property of the ten-bit secondary combinations thus chosen. If the first bit in a secondary combination, as shown in FIG. 3B, is inverted, its convention DC component is changed from −2 to +2. It is possible to invert other bits within secondary combinations to change the DC component from −2 to +2, but it is preferred to change the convention DC component by inverting the first bit, since that always results in changing the DC component from −2 to +2 and changing the actual DC component from +2 or −2 to −2 or +2, respectively.

The method of this embodiment of the present invention can be understood by reference to FIGS. 4A and 4B. Assume that, as shown in FIG. 4A, a particular portion of the converted digital signal ends at the lower signal level. Assume also that the DC component of the signal at the end of this signal portion is zero. In FIGS. 4A and 4B, the inverted delta indicates the beginning and end of consecutive converted words. If the first full converted word $CW_1$ in FIG. 4A comprises a secondary combination, then its DC component will be $-2$. For all of the following words that comprise primary combinations, the DC components are zero. Thus, the DC component in the entire signal remains at $-2$. When the next secondary ten-bit combination $CW_3$ is encountered, the DC component of the signal portion including the pair of secondary combinations can be returned to zero in accordance with this embodiment of the method of the present invention by inverting a bit in the next secondary combination if its actual DC component is the same as the actual DC component of the first secondary combination in that signal portion.

Taking FIG. 4A as a first example of one embodiment of the method of the present invention, the number of level transitions in the signal portion including the pair of secondary combinations prior to the beginning of the second secondary combinations is eight, which is an even number. The level of the signal at the beginning of the second secondary ten-bit combination will be the same after an even number of level changes as the signal level at the beginning of the first secondary combination. Thus, if the second secondary combinations begins on the same level, its actual DC component will be the same, here a $-2$. But if the first bit of that second secondary combination is changed from a digital zero to a digital one, then the DC component of the second secondary combination becomes $+2$. When added to the actual DC component of the signal prior to the second secondary combination, which DC component was $-2$, the DC component of the entire signal portion is zero.

The reason that the first bit of the secondary combinations is chosen to be zero, as was pointed out above in connection with Table II, will now be clear. If secondary combinations were chosen with an initial bit of digital 1, then to change the actual DC component of that combination from $-2$ to $+2$, or vice versa, would require changing the first bit from a digital one to a digital zero. That change could result in having enough consecutive zeros to make $T_{max}/T_{min}$ greater than four.

In any case, FIG. 4B illustrates another example of the present invention. If the number of level transitions before the part of the second secondary combination is odd, then that secondary combination begins at a high level and its DC component will be $+2$. Thus, no inversion is required to make the DC component of the entire three-word signal portion shown $CW_1$–$CW_3$ in FIG. 4B zero.

The method of this embodiment of the present invention is also effective if the first secondary combination of a pair begins at a high level, which would make its actual DC component $+2$. Consider FIG. 4A, for example. If the preceding signal portion shown there ended at a high level, and the number of level changes were even, the next secondary combination would begin at a high level. That being the case, the DC component of the signal portion before the second secondary combination would be $+2$. Without inversion of the first bit of that secondary combination to a digital 1, the DC component of that second combination would also be $+2$, because it begins at a high level. If it is inverted, the actual DC component of the second secondary combination becomes $-2$. Thus, even when the preceding signal portion containing the pair of secondary combinations begins at a high level, an even number of level transitions prior to the second secondary combination requires inversion of the first bit. Likewise, when the number of transitions is odd, no inversion of the first bit is required.

FIG. 5A schematically illustrates apparatus for carrying out the method of the present invention. An input terminal 1 accepts a base digital signal. A series-to-parallel shift register 2 comprises a dividing means which accepts eight bits, $B_1$ through $B_8$, of the base signal in serial form and provides it in parallel form to a read-only memory, or ROM 3. The ROM 3 is a programmed memory device that converts each eight-bit base word into a ten-bit converted word in accordance with the principles described above. In other words, 193 of the ten-bit combinations produced by the ROM 3 will have a zero DC component, while 63 will have a DC component of $+2$ or $-2$, and none will have more than two digital zeroes at the beginning or one digital zero at the end (see Tables I and II).

Each ten-bit word is provided in parallel form to a parallel-to-series shift register 4 that comprises a combining means that provides the ten-bit combinations as a series of converted words to form the converted signal. A reading clock 5 generates a reading clock signal that reads out the words in the shift register 4 to a JK flip-flop 6. The JK flip-flop 6 modulates the converted signal into NRZI code and provides it to an output terminal 7 for recording on a magnetic tape, for example.

The programmed memory means of the converting apparatus shown in FIG. 5A also includes a logic circuit 8 for inverting the first bit of the second secondary ten-bit combination in accordance with the method of the present invention. A master clock 9 generates a master clocking signal in response to the bit rate of the base signal.

The logic circuit 8 includes a detector circuit 18 that receives the eight-bit base words from the shift register 2 and provides a detection signal d and a reset signal r at times predetermined in the operation of the apparatus. The detector circuit 18 is programmed to provide the detection signal d and reset signal r as a digital "0" if the eight-bit combination corresponds to a primary ten-bit combination and as a digital "1" if the eight-bit combination corresponds to a secondary ten-bit combination. The operation of the detector circuit 18 can be controlled by the master clock 9.

The logic circuit 8 also includes a counter 28 that counts the level transitions in the converted signal as it is read from the shift register 4 to the modulator 6. The counter 28 provides a count signal that is a digital "0" if the number of counted level transitions is an odd number and a digital "1" if the number of counted level transitions is an even number (including zero). The reset signal r is provided to a reset terminal R of the counter 28. The counter 28 is set to zero when the reset signal r is a digital "1". A reset signal r that is a digital "0" will not reset the counter.

The logic circuit 8 incorporates an AND circuit 38 and an EXCLUSIVE OR circuit 48. These operate in accordance with the conventional logic for such circuits. The AND circuit 38 provides as an output a digital "0" unless both inputs are a digital "1", in which case the AND circuit 38 provides a digital "1" output. The EXCLUSIVE OR circuit 48 provides a digital "1" output unless both inputs are the same, in which case it provides a digital "0" output. The EXCLUSIVE OR circuit 48 output comprises the first bit $P_{10}$ of each converted word. One of the inputs of the EXCLUSIVE OR circuit 48 is the first bit of the converted word as supplied by the ROM 3; the other input is the output of the AND circuit 38. The inputs of the AND circuit 38 are the detection signal d and the count signal c. In the present embodiment the EXCLUSIVE OR circuit 48 operates as a conventional OR circuit, which provides a digital "1" output unless both inputs are a digital "0", in which case it provides a digital "0" output.

The converting apparatus shown in FIG. 5A operates as follows. Assume that an initial base word $BW_0$ divided from the base signal will be converted by the ROM 3 into a primary combination. $BW_1$ will become the first ten-bit combination of the converted signal portion shown in FIG. 4A. The counter 28 starts with a count of zero, which produces a count signal at the lower logic level or a digital "0".

When the initial base word $BW_0$ is written into the ROM 3, it is also written into the detector 18. The first base word $BW_1$ begins entering the shift register 2. When $BW_1$ is ready to be written into the ROM 3, the initial converted word $CW_0$, which the ROM 3 generated with response to $BW_0$, is read from the ROM 3. Just prior to reading $CW_0$ from the ROM 3, the detector circuit 18 provides the detection signal d to the AND circuit 38 and the reset signal r to the reset terminal R of the counter 28. In this case, since $CW_0$ is a primary combination, the reset signal r and the detection signal d=0. When d=0, the output of the AND circuit 38 is always "0", regardless of the count signal c. Whenever the output of the AND circuit 38 is "0", the first bit $P_{10}$ of the converted word will be provided unchanged at the output of the OR circuit 48.

When $BW_0$ is read from the ROM 3, $BW_1$ is read into ROM 3 and, simultaneously, into the detector 18. While $BW_1$ is being converted into $CW_1$ by the ROM 3, $BW_2$ is being read into the shift register 2 and the read clock 5 is reading $CW_0$ from the shift register 4. As $CW_0$ is read from the shift register 4, the counter 28 counts the digital ones (level transitions when NRZI-coded) therein and provides the count signal c to the AND circuit 38. The JK flip-flop 6 modulates the converted signal into NRZI code as it is read from the shift register 4 and provides the NRZI-coded digital signal to the output terminal 7, from which it is provided to a recording head (not shown).

When $CW_0$ is finished reading from the shift register 4, $CW_1$ is read from the ROM 3. $CW_1$ is a secondary combination, the detection signal d−1. When r=1, the counter is reset and c=0. Thus, one of the inputs to the AND circuit 38 is "0" and the output of the AND circuit 38 is "0". The first bit $P_{10}$ of the converted word $CW_1$ is provided unchanged by the OR circuit 48.

$CW_1$ is now read from the shift register 4 and its digital ones (level transitions when NRZI-coded) are counted by the counter 28 which, it will be recalled, was reset to zero when $CW_1$ was written into the shift register 4. When $CW_1$ is read from the ROM 3, $BW_2$ is written into ROM 3 and the detector circuit 18. $BW_3$ begins reading into the shift register 2.

As $CW_1$ is read from the shift register, the ROM 3 converts $BW_2$ into $CW_2$, which is a primary combination, as shown in FIG. 4A. Just prior to reading $CW_2$ from the ROM 3 for writing into the shift register 4, the detection circuit provides d=0 to the AND circuit 38 and to the counter 28. The first bit $P_{10}$ of $CW_2$ passes the OR circuit 48 unchanged. As $CW_2$ then reads from the shift register 4, its level changes are added to the count in the counter 28.

When $CW_2$ is read from the ROM 3, $CW_3$ is written into the ROM 3 and the detector circuit 18. $CW_4$ then begins to be written into the shift register 2. As $CW_2$ is read from the shift register, the ROM 3 converts $BW_3$ into $CW_3$, which is the second secondary combination. Just prior to reading $CW_3$ from the ROM 3, the detector circuit 18 provides the detection signal d=1 to the AND circuit 38.

For every second secondary combination in the converted signal, the reset signal r=0, instead of 1. In the embodiment shown in FIG. 5A, this suppression of every other digital "1" reset signal r is accomplished by suitable logic in the detector circuit 18. Thus, the reset signal r when $CW_3$ is to be read from the ROM 3 is a digital "0". Those skilled in the art will easily be able to construct suitable logic circuitry for accomplishing that suppression.

In any case, when $CW_3$ is read from the ROM 3, using the example shown in FIG. 4A, the counter 28 provides the count signal c=1. Thus, both inputs to the AND circuit 38 are "1", and the output of the AND circuit is "1". Since the first bit $P_{10}$ of $CW_3$ is zero, the OR circuit 48 inputs are "1" and "0", which provides an output of "1", thus inverting the first bit $P_{10}$ of $CW_3$.

It will be appreciated that if the converted signal $CW_1$–$CW_3$ appeared as shown in FIG. 4B, at the beginning of $CW_3$ the count signal c=0. Then, the AND circuit 38 output would be "0" and the first bit $P_{10}$ of $CW_3$ would not be inverted.

FIG. 5B shows an alternate embodiment of a converting apparatus that does not rely on actually counting the number of level changes in each converted word in NRZI code. This embodiment includes the input terminal 1, the series-to-parallel shift register 2, the parallel-to-series shift register 4, the reading clock 5, the JK flip-flop 6 and the output terminal 7 substantially the same as those respective components of the embodiment shown in FIG. 5A. The embodiment of FIG. 5B includes a slightly modified ROM 3', logic circuit 8' and master clock 9'.

The ROM 3' converts the base words BW into converted words CW according to the logic table shown in FIG. 5C. The ROM 3' also generates a parity bit or signal $P_0$ and a latch signal Q for each converted word. The logic circuit 8' is a flip-flop that latches the latch signal Q and, in response to a timing pulse provided by the master clock 5, provides the latch signal Q as the control signal Q' for use in generating a converted word from the next base word.

The apparatus shown in FIG. 5B operates as follows. Assume that $CW_0$ is a primary combination and when the first base word $BW_0$ is provided to the ROM 3', $Q_0'=0$.

The ROM 3' generates $CW_0$ from $BW_0$ in accordance with a pre-programmed one-to-one correspondence of base words to the primary ten-bit combinations that comprise the converted words. The ROM 3' is programmed to provide the parity bit $P_0$ in accordance with the number of level transitions in each converted word, when in NRZI code, such that the parity bit $P_0$ is "0" if the number is even and the parity bit $P_0$ is "1" if the number is odd. The parity bit $P_0$ is thus a count signal which indicates the number of level transitions in each converted word when NRZI-coded. ROM 3' also is programmed to generate the latch signal Q in response to the parity bit $P_0$ and the control signal Q' in accordance with the table in FIG. 5C. In this case, assume $CW_0$ has an even number of level changes, so that $P_{00}=0$. Since $Q_0'=0$, $Q_0$ is generated as a digital "0", in accordance with FIG. 5C. When $CW_0$ is read from the ROM 3' into the shift register 4, the flip-flop 8' latches $Q_0$ and provides it to the Q' input of the ROM 3' as $Q'_1$. Thus $Q_1'=Q_0=0$.

Assume that the ROM 3' is programmed to convert the base words $BW_1$ into a secondary combination $CW_1$. The ROM 3' is programmed to provide one of two complementary ten-bit secondary combinations for each eight bit-combination that does not correspond to a primary combination. Which one of the complementary combinations depends on the value of Q'. If $Q'=0$, then the ten-bit secondary combination has a convention DC component of +2, under the convention used to construct Table II above. If $Q'=1$, the ten-bit combination having a DC component of −2 is selected. The two secondary combinations for each such base word differ only in their first bit. For example, if the secondary combination shown as $CW_1$ in FIG. 4A is one of the complementary ten-bit combinations corresponding to $BW_1$, then the other complementary combination will have a digital "1" as the first bit $P_1$.

In the present example, $Q'_1=0$, so that the convention DC component of the secondary combination is to be +2. Thus, if $BW_1$ has as one of its complementary ten-bit combinations the converted word $CW_1$ shown in FIG. 4A, then $CW_1$ will be provided as the other complementary ten-bit combination corresponding to the $CW_1$ shown in FIG. 4A. Thus, it will have a convention DC component of +2, using the convention used for Table II, and an odd number of level changes. Since it begins at the lower signal level, it will also have an actual DC component of +2. $P_{01}$ will thus be 1 and $Q_1$ will be 0 (because $P_{01}=1$ and $Q'_1=0$). Thus, $Q'_2=0$ ($=Q_1$).

Continuing with the example shown in FIG. 4A, the number of level changes in $CW_2$ is even, so that $P_{02}=0$. Thus $Q_2=0$ (since $P_{02}=0$ and $Q_2'=0$) and $Q'_3=0$. Since the number of level changes in $CW_1$ was odd and in $CW_2$ was even, the total number of level changes since the beginning of $CW_1$ is odd.

Assume $CW_3$ is either of the complimentary ten-bit combinations shown in FIGS. 4A and 4B. $Q_3'=0$, so that the ROM 3' provides the ten-bit combination $CW_3$ with a convention DC component of +2 (under the convention wherein the DC component is measured with the previous ten-bit combination ending at low signal level). Since the number of level transitions from the beginning of $CW_1$ is odd, the actual DC components of $CW_3$ will thus be opposite to the actual DC components of $CW_1$, so that the DC component of the signal portion including $CW_1$ and $CW_3$ will be zero.

It will be appreciated that the apparatus shown in FIG. 5B, using the ROM 3' programmed in accordance with the table in FIG. 5C, will provide each secondary combination with an actual DC component different from the actual DC component of the preceding secondary combination.

With the apparatus shown in FIG. 5A, it is possible to have one signal portion with two secondary combinations with the same actual DC component. Consider the signal portion shown in FIG. 4B. If $CW_1$ had begun at the higher signal level, $CW_3$ would have an actual DC component of −2. Then, if $CW_4$ were a secondary combination, it would have an actual DC component of −2. Thus, the signal portion containing $CW_3$ and $CW_4$ would have a DC component of −4. It would be necessary on playback to provide suitable processing circuitry to avoid obtaining a faulty reference level for restoring the signal. Using the apparatus shown in FIG. 5B, with the ROM 3' programmed as in FIG. 5C, it is only necessary to use a signal portion having two secondary combinations.

Figure 6:
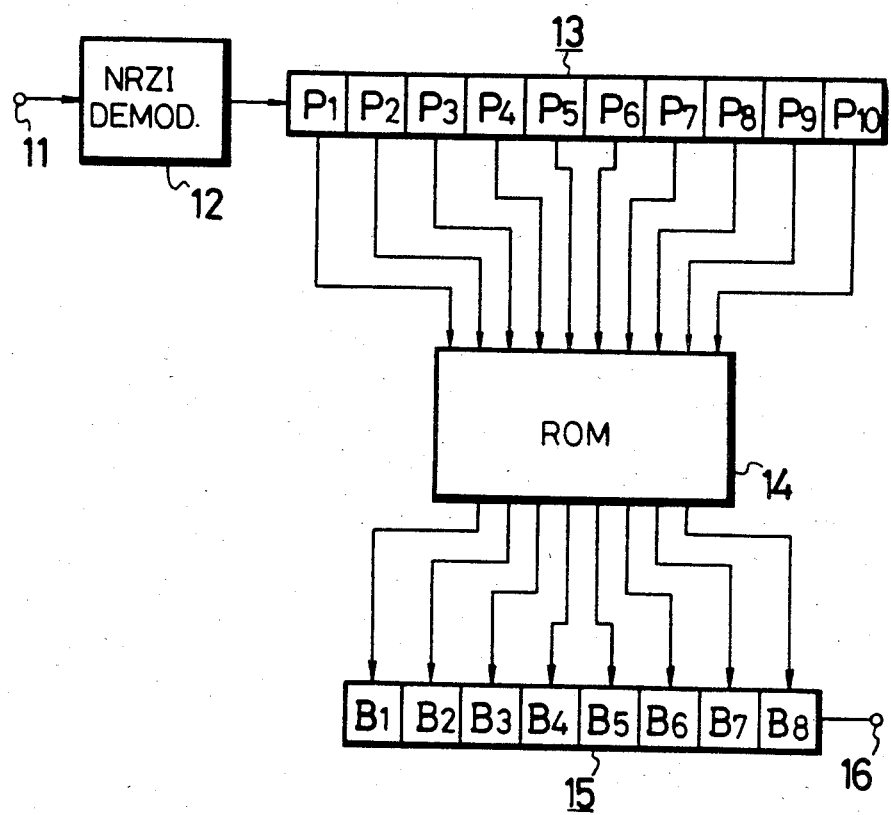
FIG. 6 schematically illustrates apparatus for restoring an n-bit base digital signal from the m-bit NRZI-coded converted digital signal generated in accordance with the present invention.

To restore the signal, the playback circuit includes the restoring apparatus shown in FIG. 6. An input terminal 11 accepts the digital data reproduced from a tape, for example. Because the DC component was effectively made zero in recording, the NRZI-coded signal can be accurately recovered, as will be appreciated by considering FIGS. 1A-1D.

In any case, the reproduced NRZI-coded digital signal is provided to a demodulator 12 which decodes the data. The reconstructed signal from the demodulator 8 is provided to a series-to-parallel shift register 13. The ten-bit combinations are provided in parallel form to a restoring ROM 14 which converts the signal into the original eight-bit base words. The data is then provided in serial form to an output terminal 16.

In restoring the signal, the inversion of the starting bits of the ten-bit secondary combinations is not taken into account because it is known that all of the information in the secondary combinations is contained in the next nine bits after the first bit.

Those skilled in the art will appreciate that in the present invention $T_w=T_{min}=0.8T$ and $T_{max}=3.2T$. Of course, the present invention is not as advantageous as converting using the Gabor code, in which $T_{max}=1.33T$ and $T_{max}/T_{min}=2$. However, the lengthened time between transitions in the present invention is offset by the elimination of a DC component in the recorded signal.

The recording density using the present system can even be increased over that possible in known 4/5 conversion systems. In the conversation system of the present invention, the elimination of the DC component effectively eliminates time-base fluctuations, as will be appreciated from FIGS. 1A-1D. Thus, the recording density can be increased because no allowance need be made for time-base fluctuations.

Those skilled in the art will appreciate that modifications can be made to the embodiments of the invention so far described. For example, in the embodiment illustrated in FIGS. 4A and 4B, the secondary combinations were chosen from those ten-bit combinations in which the convention DC component was −2. However, the secondary combinations can be chosen from ten-bit combinations beginning with a digital "0" and having convention DC components of −2 and +2. In that case, a programmed memory means can be used in the converting apparatus shown in FIG. 5A to identify whether the first secondary combination of a pair is one with a +2 or a −2 convention DC component. Because all of the possible secondary combinations are predetermined, the ROM can be programmed to determine whether a particular ten-bit combination has a +2 or −2 convention DC component. If the first secondary combination of a pair had a convention DC component of +2, and the number of level changes in the signal before beginnng the second secondary combination are known, then depending on whether the second secondary combination has a convention DC component of +2 or −2, its first bit will be inverted or not inverted by the ROM. In other words, if the two secondary combinations have the same convention DC component and the number of level changes is even, or if they have different convention DC components and the number of level changes is odd, the first bit of the second secondary combination is inverted. The EXCLUSIVE OR circuit 48 also enables modification of the apparatus shown in FIG. 5A to provide the correct first bit for secondary combinations which begin with a digital one.

For example, in FIG. 4A, assume that the first secondary combination had a convention DC component of +2 (that is, using the convention established for Table II, in which the word starts at a low level) and the total number of level changes to the beginning of the second secondary combination is even. In that case, the first bit of the next secondary combination would not be inverted if that secondary combination was one with a convention DC component of −2. It will be appreciated that the inversion or non-inversion of the first bit in the second secondary combination takes place independently of the level at which the first secondary combination began.

Those skilled in the art will also recognize that the principles of the present invention are applicable beyond an 8/10 converting system and can be used in any suitable system in which n bits of data are converted to m bits of data, where m is greater than n.

Although specific embodiments of the invention have been described in detail herein with reference to the accompanying drawings, it is to be understood that the invention is not limited to those embodiments, and that various changes and modifications other than those pointed out can be effected therein by one skilled in the art without departing from the scope or spirit of the invention as defined in the appended claims.

What is claimed is:

1. A method of providing a bi-level digital signal having a DC component substantially equal to zero and a predetermined maximum time between level transitions, the method comprising:
dividing a base digital signal into a series of base words each with n bits of data, where n is eight;
converting said base digital signal into a converted digital signal by matching a converted word with each said base word, each said converted word having m bits of data, wherein m is ten and said converted digital signal has a maximum number of consecutive digital zeroes equal to three, said converted words including a plurality of primary combinations of m bits having a DC component substantially equal to zero when NRZI-coded and a plurality of secondary combinations of m bits having a DC component with an absolute value of two when NRZI-coded, and in which said primary combinations begin with a maximum of two digital zeroes, end with a maximum of one digital zero, and have a maximum of three consecutive digital zeroes anywhere therein;
providing said secondary combinations with DC components when NRZI-coded so that a portion of said converted digital signal including a pair of said secondary combinations has a DC component substantially equal to zero when NRZI-coded, and in which said secondary combinations have convention DC components, defined as the DC component when the preceding combination ends at a lower signal level, when NRZI-coded, of +2 and −2 begin with a maximum of two digital zeroes, end with a maximum of one digital zero, and have a maximum of three consecutive digital zeroes anywhere therein; and
generating said converted digital signal as an NRZI-coded digital signal.

2. A method as in claim 1; wherein said base words are individually stored and converted into said converted words, each said converted word is stored and said DC component is determined while said converted word is stored said converted words are read from storage to form said converted digital signal and said NRZI-coded digital signal is generated from said converted words after the reading thereof from storage.

3. A method as in claim 1; wherein each said secondary combination when NRZI-coded has an actual DC component different from the actual DC component of the preceding said secondary combination.

4. A method as in claim 3; wherein each said secondary combination is chosen from two complementary 10-bit combinations differing only in the first bit of data thereof, the method further comprising:
detecting the level transitions in a portion of said converted signal, when NRZI-coded, beginning with the first bit of data of each said secondary combination; and
selecting the next secondary combination from said complementary secondary combinations so that said secondary combination has the same convention DC component as said next-preceding secondary combination when said number of detected level transitions is odd and a different convention DC component from said next-preceding secondary combination when said number of detected level transitions is even.

5. The method as in claim 1; wherein said secondary combinations are chosen from the 10-bit combinations beginning with a digital zero, the method further comprising:
counting the level transitions in said converted digital signal, when NRZI-coded, beginning with the first bit of data of a secondary combination; and
inverting the first bit of data in the next secondary combination when said number of counted level transitions is even and said convention DC components of said two secondary combinations are the same and when said number of counted level transitions is odd and said convention DC components of said two secondary combinations are different.

6. A method as in claim 1; wherein said convention DC components, of said secondary combinations are substantially equal, the method further comprising:
counting the level transitions in said converted digital signal, when NRZI-coded, beginning with the first bit of data of a secondary combination; and
inverting the first bit of data in the next said secondary combination if the number of said counted level transitions prior to said next secondary combination is even.

7. A method as in claim 1; wherein said primary combinations consist of the 193 10-bit combinations having a DC component substantially equal to zero when NRZI-coded, begin with a maximum of two digital zeroes, end with a maximum of one digital zero and have a maxiumum of three consecutive digital zeroes anywhere therein and said secondary combinations are chosen from the remaining 10-bit combinations having a DC component with an absolute value of two, beginning with a maxmium of two digital zeroes, ending with a maxium of one digital zero and having a maximum of three consecutive digital zeroes therein, each said secondary combination ending with a combination of nine bits of data unique to that said secondary combination.

8. A method of restoring said converted digital signal generated in accordance with the method in claim 1; comprising the steps of
demodulating said NRZI-coded digital signal into a reconstituted digital signal;
dividing said reconstituted digital signal into a series of reconstituted words each with m bits of data and respectively corresponding to one of said m-bit converted words;
converting each said reconstituted word into a restored word with n bits, said restored word corresponding to the n-bit base word that was converted into said one converted word; and
providing said reconverted digital signal as a series of said reconverted words.

9. A method of restoring said converted digital signal generated inaccordance with the method in claim 7; comprising the steps of
demodulating said NRZI-coded digital signal into a reconstituted digital signal;
dividing said reconstituted digital signal into a series of reconstituted words each with ten bits of data and respectively corresponding to one of said 10-bit converted words;
converting each said reconstituted word into a restored word with eight bits, and restored word corresponding to the eight-bit base word that was converted into said one converted word, by providing said reconstituted words corresponding to said secondary combinations without regard to the first bit thereof; and
providing said reconverted digital signal as a series of said reconverted words.

10. Converting apparatus for providing a bi-level digital signal having a DC component substantially equal to zero and a predetermined maximum time betwen level changes, the apparatus comprising:
dividing means for dividing a base digital signal into a series of base words each with n bits of data;
programmed memory means for converting each said base word into a matching converted word, each with m bits of data, wherein m is greater than n and said converted word, when arranged serially, form a converted signal with a predetermined maximum number of consecutive digital zeroes, said converted words including a plurality of primary combinations of m bits having a DC component substantially equal to zero when NRZI-coded and a plurality of secondary combinations having a DC component with an absolute value of two when NRZI-coded, and for providing said secondary combinations with DC components when NRZI-coded so that a portion of said converted signal including a pair of said secondary combinations has a DC component substantially equal to zero when NRZI-coded, combining means for accepting said converted words from said memory means and providing said converted signal; and
modulating means for providing said converted signal in NRZI-code
and wherein said programmed memory means detects the number of level transitions in each said converted word and provides a count signal in response to said detection for indicating whether said number is even or odd and said programmed memory means includes logic means for providing a control signal in response to said count signal to indicate whether the total number of level transitions in said portion of said converted digital signal, when NRZI-coded, beginning with the first bit of data thereof is odd or even and said programmed memory means provides the next said secondary combination of said pair with a DC component different from the DC component of the preceding said secondary combination of said pair in response to said control signal, and in which said programmed memory means inverts the first bit of data in the next said secondary combination of said pair when said control signal indicates that said number of level transitions from the beginning of said preceding secondary combination is even.

11. Converting apparatus as in claim 10; wherein
said dividing means includes a series-to-parallel shift register for simultaneously providing eight bits of the base digital signal to said programmed memory means;
said combining means includes a parallel-to series shift register for accepting ten bits of data comprising a converted word and providing said bits one-by-one as said converted digital signal; and
said modulating means includes a JK flip-flop circuit for accepting said bits from said parallel-to-series register.

12. Converting apparatus for providing a bi-level digital signal having a DC component substantially equal to zero and a predetermined maximum time between level changes, the apparatus comprising:
dividing means for dividing a base digital signal into a series of base words each with n bits of data;
programmed memory means for converting each said base word into a matching converted word, each with m bits of data, wherein m is greater than n and said converted words, when arranged serially, form a converted signal with a predetermined maximum number of consecutive digital zeroes, said converted words including a plurality of primary combinations of m bits having a DC component substantially equal to zero when NRZI-coded and a plurality of secondary combinations having a DC component with an absolute value of two when NRZI-coded, and for providing said secondary combinations with DC components when NRZI-coded so that a portion of said converted signal including a pair of said secondary combinations has a DC component substantially equal to zero when NRZI-coded;
combining means for accepting said converted words from said memory means and providing said converted words in a series to form said converted signal;
modulating means for providing said converted signal in NRZI-code;
and logic means including;
a detector circuit for accepting said base words and providing a detection signal and a reset signal as digital ones when said corresponding converted word is a secondary combination and as digital zeroes when said corresponding converted word is a primary combination, wherein said detector circuit provides said reset signal as a digital zero for every other said secondary combination;
a counter for detecting the number of level changes in said converted digital signal when NRZI-coded and providing said count signal as a digital one when said number is odd and a digital zero when said number is even, said counter including a reset terminal for accepting said reset signal and resetting said counter to zero when said reset signal is a digital one;

an AND circuit for accepting said detection signal and said count signal and providing said control signal in response thereto; and an OR circuit for accepting said control signal and the first bit of data of said converted word and providing as the output of said OR circuit the first bit of data of said converted word to said combining means.

13. Converting apparatus as in claim 12; wherein each said secondary combination has a convention DC component of $-2$ prior to inversion of the first bit of data thereof.

14. Converting apparatus as in claim 10; wherein:
said secondary combinations have convention DC components, defined as the DC component of a combination when the preceding combination end at the lower signal level when NRZI-coded, of $+2$ and $-2$; and said programmed memory means provides each said secondary combination with an actual DC component different from the actual DC component of said previous secondary combination.

15. Converting apparatus as in claim 14; wherein:
said dividing means comprises a master clock for providing a master clocking signal;

said programmed memory means is programmed to select said secondary combinations from two complementary ten-bit combinations differing only in the first bit of data thereof in response to said control signal and to read said converted words and corresponding latch signal, which latch signal is generated from said count signal and said control signal by said programmed memory means, in response to said master clocking signal; and said logic means includes a latch means for accepting said latch signal provided for each said converted word and providing said latch signal as the control signal for the next-following said converted word in response to said master clocking signal.

16. Converting apparatus as in claim 15; wherein:
said programmed memory means generates a parity bit as said count signal for each converted word, said parity bit being a digital one if the number of level transitions in said converted word is odd and a digital zero if the number of level transitions in said converted word is even;

said control signal is a digital zero or digital one and said programmed memory means provides said secondary combinations with convention DC components of $+2$ when said control signal is a digital zero and with convention DC components of $-2$ when said control signal is a digital one; and said programmed memory means generates said latch signal for primary combinations as a digital zero if said control signal and said parity bit therefor are the same and as a digital one if said control signal and said parity bit therefor are different and for secondary combinations as a digital one if said control signal and said parity bit therefor are the same and as a digital zero if said control signal and said parity bit therefor are different.

17. Converting apparatus as in claim 11; wherein said dividing means includes a master clock for providing a master clocking signal to control reading of said converted words from said programmed memory means into said parallel-to-series shift register.

18. Apparatus as in claim 17; wherein m is ten and n is eight and said parallel-to-series shift register and said JK flip-flop are controlled by read clock that generates a reading clocking signal having a clock rate 5/4 of the clock rate of said master clocking signal.

19. Apparatus as in claim 11; wherein said programmed memory means is a read-only memory.

* * * * *